May 1, 1962
E. T. CLINE
PROCESS FOR CHEMICALLY BONDING A COATING TO AN ORGANIC POLYMER SUBSTRATE
Original Filed April 20, 1956
Re. 25,164
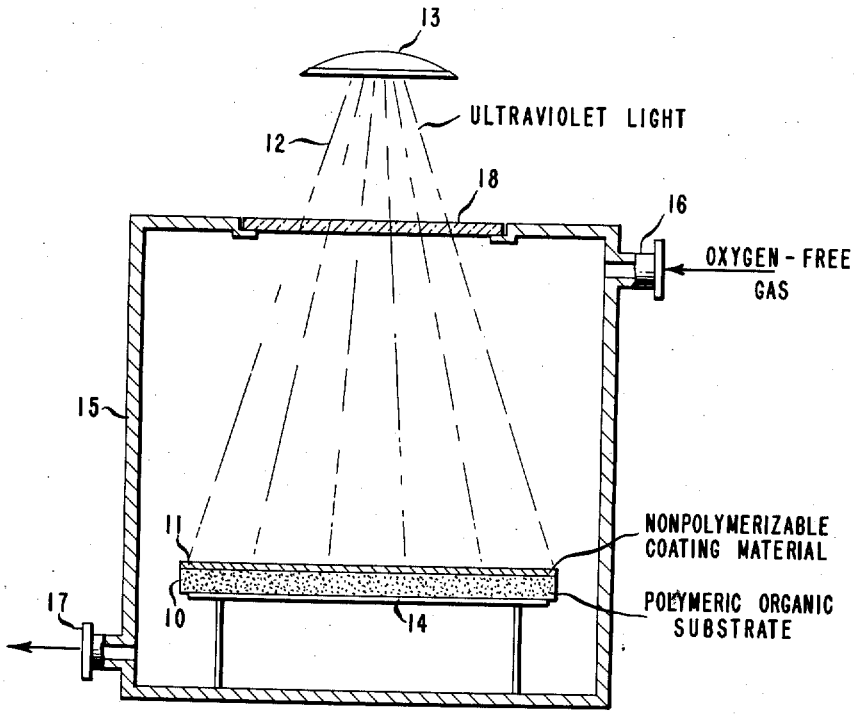
INVENTOR
EDWARD TERRY CLINE
BY James H. Ryan
ATTORNEY United States Patent Office Re. 25,164
Reissued May 1, 1962

25,164

PROCESS FOR CHEMICALLY BONDING A COATING TO AN ORGANIC POLYMER SUBSTRATE

Edward Terry Cline, New Castle County, Del., assignor to E. I. du Pont de Nemours and Company, Wilmington, Del., a corporation of Delaware Original No. 2,875,092, dated Feb. 24, 1959, Ser. No. 579,439, Apr. 20, 1956. Application for reissue Jan. 27, 1961, Ser. No. 85,440

8 Claims. (Cl. 117—62)

Matter enclosed in heavy brackets [ ] appears in the original patent but forms no part of this reissue specification; matter printed in italics indicates the additions made by reissue.

This invention relates to an improved coating process, and is more particularly concerned with the use of ultraviolet light in applying coatings of non-polymerizable organic materials to films, fibers and other shaped objects of polymeric materials.

Improved surface characteristics are desirable in many of the uses of both synthetic and natural polymers. Thus the static properties of synthetic fibers are often a problem in fabric uses. Better scratch resistance is usually desirable in transparent plastic sheet material used as artificial glass, and improved surface slip is often desirable for polymer films. Organic coating materials are known which will provide better surface characteristics in such respects, but coatings of non-polymerizable materials have not been sufficiently permanent for most purposes, being readily rubbed, flaked or washed off. Better coatings have been obtained when using polymerizable coating materials, which are polymerized after application, but this has not proven to be a practical solution to the problem because of the nature of the materials and equipment required; the method is not adaptable to ordinary coating procedures and the types of materials which can be used are extremely limited.

It is an object of this invention to provide a practical and economical process for forming on a polymer a substantially permanent coating of chemically distinct non-polymerizable organic material, and which does not depend upon the use of polymerizable coating materials. Another object is to provide such a process which is of particular value in applying antistatic coatings to textile materials and the like.

Another object is to provide textile materials of improved antistatic properties.

The above-mentioned and yet other objects of the invention are achieved in accordance with the remainder of the specification and with the appended drawing in which:

The FIGURE represents schematically and simultaneously a flow-sheet of the process and apparatus in which the process can be accomplished. In this drawing an organic polymeric substrate 10 coated with a chemically distinct non-polymerizable organic material 11 having a critical coefficient of extinction (see infra) is shown being irradiated with ultraviolet light 12 from any convenient source 13. Substrate 10 is held on support 14 within an airtight box 15 provided with gas inlet 16, gas outlet 17, and a window 18 transparent to ultraviolet radiation.

The physical manipulations required for accomplishing the process are fairly simple. They consist primarily in applying the chemically distinct non-polymerizable organic material to the polymer so as to form a coating having an extinction coefficient of at least 0.5 at a wave length of 2000–4000 A. and subjecting the coating to ultraviolet light in the absence of oxygen to form a chemical bond between the material and the polymer.

The non-polymerizable organic coating material may be a mixture of several compounds, at least one of which must exhibit substantial absorption of ultraviolet light in the wave length range of 2000–4000 A., and particularly from 2000–3000 A. It is not essential that all the matter of the coating material be ultraviolet-absorbent since, in the examples below, it is shown that when at least one ultraviolet absorber is present in a coating mixture, other non-absorbent, non-polymerizable organic materials become attached. However, the bonding process operates more efficiently when all of the coating material is ultraviolet-absorbent, and this represents the preferred practice.

In a preferred embodiment of this invention, a shaped organic polymer is coated with a thin layer of an ultraviolet-absorbent, non-polymerizable organic coating material. The coated polymer is placed in an atmosphere of nitrogen and irradiated with ultraviolet light until the coating is substantially permanently attached to the polymer. Because of its greater activity in this process, ultraviolet light of wave length in the range of 2000–3000 A. is especially preferred. In using the shorter wave lengths of ultraviolet light, the efficiency of the attachment process is improved by operating in an atmosphere of reduced ultraviolet absorbency such as nitrogen or, more particularly, in a vacuum. When the assembly is returned to the air, the coating material is found to be chemically bonded to the polymer so that the coating cannot be separated from the polymer by abrasion or by the action of solvents, such as the one used to deposit the coating material before irradiation.

In the following examples parts are by weight unless otherwise specified.

EXAMPLE I

Nylon taffeta fabric woven from 70 denier 34 filament yarn and having a thread count of 112 x 72 is padded with a 16% aqueous solution of a "Bisphenol A"/epichlorohydrin-coupled polyethylene glycol of the approximate composition

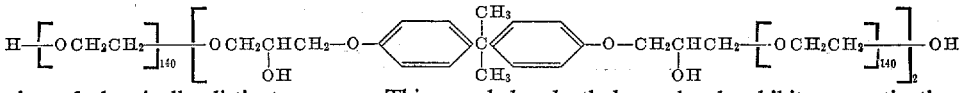

This coupled polyethylene glycol exhibits an extinction coefficient (k) of 1.5 at 2280 A. 1.45 at 2190 A. and 5.0 at 2000 A., and has the same ultraviolet light absorption spectrum except for intensity as 2,2-(4,4'-dihydroxydiphenyl)propane ("Bisphenol A"). The fabric is dried and a gain in weight of 21% over the uncoated fabric is observed. The impregnated fabric is placed in a box having a Corning Filter, Glass Code 791, Color Specification 9–54, ground and polished to about 2 mm. thickness, as the top closure. This filter transmits 25% at 2310 A., 50% at 2415 A., 75% at 2650 A. and 90% at 3320 A. and higher. Nitrogen is passed through the box to exclude air. The box is placed under a Hanovia Analytic Model lamp that employs a 325-watt type L burner and has an output of about 78 watts below 4000 A. The box is arranged so that the fabric is about 7" from the lamp. After one hour of irradiation, the fabric is turned over and irradiation is continued for a second hour, the nitrogen atmosphere being maintained. The fabric is removed and laundered once. After conditioning overnight at 50% relative humidity and 23° C., the fabric is tested with a sensitive meter of the type described by Hayek and Chromey, Am. Dyestuff Rptr., 40, 225 (1951). The log of the resistivity (log R) is 10.7 as compared with over 13.3 for an untreated control fabric (the value 13.3 is the highest reading attainable with the meter employed). Fabrics having a log R of 12 or less do not develop static in apparel usage. Cotton has a log R of about 10.8.

The fabric is then laundered repeatedly and tested for resistivity. The results are shown in the following table.

| Number of Launderings | Log R | Fabric Weight Gain (over Untreated Weight), Percent |
|---|---|---|
| 10 | 9.9 | |
| 20 | 10.6 | |
| 30 | 9.9 | 9.7 |
| 40 | 10.8 | |
| 50 | 10.9 | 4.5 |

Each laundering comprises exposure in a mechanically agitated washer for 30 minutes in an 0.125% aqueous solution of a commercial detergent at about 70° C., followed by thorough rinsing with water. It is evident that this treatment is permanent for all practical purposes since most garments are worn out or discarded long before they have been laundered fifty times. It should also be noted that no weight correction is made for the wear of laundering so that weight decrease is at least partly due to physical loss.

In a control experiment, a similarly impregnated fabric is exposed in air in the same location relative to the ultraviolet light source and without any filter (i.e., the ultraviolet radiation is somewhat more intense, especially at the lower wave lengths). No attachment is observed, since after one laundering the fabric has a log R above 13.3 and exhibits no gain in weight.

EXAMPLE II

Example I is repeated except that a more opaque Corning Filter, Glass Code 9700, Color Specification 9–53 is used. This filter transmits 25% at 2800 A., 50% at 2910 A., 75% at 3060 A. and 90% at 3400 A. and higher. Observations on the fabric are as follows:

| Number of Launderings | Log R | Fabric Weight Gain (over Untreated Weight), Percent |
|---|---|---|
| 1 | 10.7 | 7.2 |
| 10 | 10.5 | 5.0 |
| 20 | 11.6 | 0.7 |
| 30 | 12.6 | −0.5 |

It is noted that the coating remained attached through twenty launderings.

EXAMPLE III

Example I is repeated except that the still more opaque Corning Filter, Glass Code 0160, Color Specification 0–54 is employed. This filter transmits 25% at 3100 A., 50% at 3160 A., 75% at 3260 A. and 90% at 3500 A. and higher. The treated fabric shows log R values of 12.0 and 13.2 after one and ten launderings, respectively, and a weight gain of 0.5% after one laundering. This indicates that the most effective radiation for attachment of coatings according to this invention is in the range of wave lengths below about 3000 A.

EXAMPLE IV

A fabric of polyethylene terephthalate ("Dacron" polyester fiber) is coated with the coupled polyethylene glycol of Example I and irradiated with ultraviolet light as in Example I. After one and ten launderings, respectively, the values of log R are 11.3 and 12.1. An uncoated control fabric has a log R above 13.1.

EXAMPLE V

Nylon taffeta fabric, like that in Example I, is coated with polyethylene glycol of approximately 10,000 molecular weight ("Carbowax" 10M) and irradiated with ultraviolet light as in Example I. The polyethylene glycol employed shows an extinction coefficient (k) below 0.5 in the range 2000–4000 A. For example, k is 0.038 at 2100 A. and 0.07 at 2000 A. Weight gain after impregnation and drying is 12.2%. Following irradiation and one laundering, the fabric has a log R above 13.3 and a residual weight gain of only 0.4%. This indicates that little, if any, attachment occurred.

The above procedure is repeated except that the fabric is padded with an aqueous solution containing 16% polyethylene glycol of approximately 10,000 molecular weight ("Carbowax" 10M), 0.4% of 2,2-(4,4'-dihydroxydiphenyl)-propane and 15% ethyl alcohol, by weight, and the fabric is dried. After irradiation as in Example I and one laundering, the fabric has a log R of 12.1 and a weight gain of 1.1%. This weight gain is greater by 0.7% than the theoretical weight gain possible from attachment of all the 2,2-(4,4'-dihydroxydiphenyl)propane employed, and indicates that a substantial amount of the polyethylene glycol is attached along with the ultraviolet-absorbent coating material. 2,2 - (4,4'-Dihydroxydiphenyl)-propane has an extinction coefficient (k) of 15 at 2850 A., 65 at 2280 A., 57 at 2180 A. and 100 at 2070 A.

The term polymer is intended to include any normally solid organic polymeric material, particularly those with molecular weights in excess of 500 and preferably in excess of 1000. Thus, there may be employed hydrocarbon polymers, such as polyethylene, polystyrene, polybutadiene, rubber, polyisobutylene, butadiene/styrene copolymers and the like; halogenated hydrocarbon polymers, such as polyvinyl chloride, polyvinylidene chloride, polychloroprene, polytetrafluoroethylene, polyvinyl fluoride and the like; ester-containing polymers, such as polyvinyl acetate, polymethyl methacrylate, polyethylene terephthalate cellulose acetate and the like; hydroxyl-containing polymers, such as polyvinyl alcohol, cellulose, regenerated cellulose and the like; ether-containing polymers, such as solid polytetrahydrofuran, polyformaldehyde, dioxolane polymers and the like; condensation polymers, such as phenolformaldehyde polymers, urea-formaldehyde polymers, triazine-formaldehyde polymers; polyamides, polyimides and the like, polyacrylonitrile, polyvinyl acetals and copolymers based on two or more of the above compounds, as well as natural and synthetic protein polymers such as wool and the like.

Non-polymerizable organic coating material is used to designate an organic compound or composition which is chemically distinct from the shaped organic polymer and is free of units of ethylenic carbon-to-carbon unsaturation which are polymerizable by any of the customary free radical-type or ionic-type polymerization catalysts. In particular, terminal vinylene, $CH_2{=}C<$, groups must not be present since they may undergo vinyl polymerization under ultraviolet irradiation. Thus, the coating material may be a compound containing at least one C—X bond where X is hydrogen, halogen, or carbon such as a hydrocarbon, halogenated hydrocarbon, alcohol, amine, aldehyde, ketone, ether, acid, ester, amide, phenol, sulfonic acid nitro compound, fat, synthetic polymer and the like. By reason of enhanced reactivity, because of their ability to absorb ultraviolet light, a preferred group of organic compounds are aromatic compounds. Another preferred group are heterocyclic compounds having conjugate unsaturation. Other non-polymerizable materials that may be used are dipyrone and diacetyl.

When it is desired to attach materials that have extinction coefficients below 0.5 in the range 2000–3000 A., sufficient of another component that has appreciable absorption of ultraviolet light should be included to provide a suitable absorption value. This is illustrated in Example V. Whether the non-polymerizable organic compound has appreciable ultraviolet absorption and is used alone or has no appreciable ultraviolet absorption and is used in a composition containing a minor amount of an ultraviolet absorbing organic compound, it is preferable that the coating material have an extinction coefficient (k) of at least 0.5 at some wave length in the range of 2000–

3000 A. The extinction coefficient is determined from the relationship $$\log\left(\frac{\text{incident light}}{\text{transmitted light}}\right)=kCL$$

where the transmitted light is measured after passage through a solution of the material in a solvent in conventional manner, C is the concentration of material being tested in grams per liter of solution, L is the length of light path through the solution in centimeters, and k is the extinction coefficient for the material calculated by substituting the test data in the equation.

Temperaure is not a critical factor in the present invention, and the process can be carried out over a wide range of temperatures, e.g., from −80° C. up to the distortion or decomposition temperature of the polymer substrate. However, there is no advantage in operating at extremes of temperature and, for practical reasons, room temperature is preferred.

As shown in the foregoing examples, the process of this invention is particularly useful for attaching substantially permanent antistatic coatings to fibrous materials, such as clothing, rugs, and the like.

Since many different embodiments of the invention may be made without departing from the spirit and scope thereof, it is to be understood that the invention is not limited by the specific illustrations except to the exent defined in the following claims.

What is claimed is:

1. In a process for improving the surface characteristics of an organic polymer by coating the polymer with a chemically distinct organic material free of *ethylenic* carbon-to-carbon unsaturation, the improvement of applying said material as a coating having an extinction coefficient of at least 0.5 at a wavelength in the range of 2000–4000 A. and subjecting the coating to ultraviolet light in the absence of oxygen to form a chemical bond between the material and the polymer.

2. A process as defined in claim 1 wherein said material is an organic compound having an extinction coefficient of at least 0.5 at a wave length in the range of 2000–3000 A.

3. A process as defined in claim 1 wherein said coating material is a composition containing an organic compound to be chemically bonded to the polymer and at least one component capable of absorbing ultraviolet light.

4. A process as defined in claim 1 wherein said coating is subjected to ultraviolet light of a wavelength of 2000–3000 A.

5. A process as defined in claim 1 wherein the organic polymer is fibrous.

6. A process as defined in claim 5 wherein the organic polymer constitutes a fabric.

7. The process of improving the properties of nylon which comprises impregnating the same with a polyethylene glycol having an extinction coefficient of at least 0.5 at a wavelength in the range of 2000–4000 A. and subjecting the coating to ultraviolet light in the absence of oxygen to form a chemical bond between the polyethylene glycol and the nylon.

8. The process of improving the properties of polyethylene terephthalate which comprises impregnating the same with a polyethylene glycol having an extinction coefficient of at least 0.5 at a wavelength in the range of 2000–4000 A. and subjecting the coating to ultraviolet light in the absence of oxygen to form a chemical bond between the polyethylene glycol and the polyethylene terephthalate.

References Cited in the file of this patent or the original patent

UNITED STATES PATENTS

| | | |
|---|---|---|
| 2,129,132 | Hunter | Sept. 6, 1938 |
| 2,229,343 | Saunders | Jan. 21, 1941 |
| 2,262,270 | Cummings | Nov. 11, 1941 |
| 2,367,670 | Christ | Jan. 23, 1945 |
| 2,453,770 | Wendt | Nov. 16, 1948 |
| 2,459,279 | Holden | Jan. 18, 1949 |